Aug. 25, 1936.  W. A. MULLIO  2,052,147
REMOTE RADIO SET CONTROL MEANS
Filed Aug. 12, 1930  3 Sheets-Sheet 2
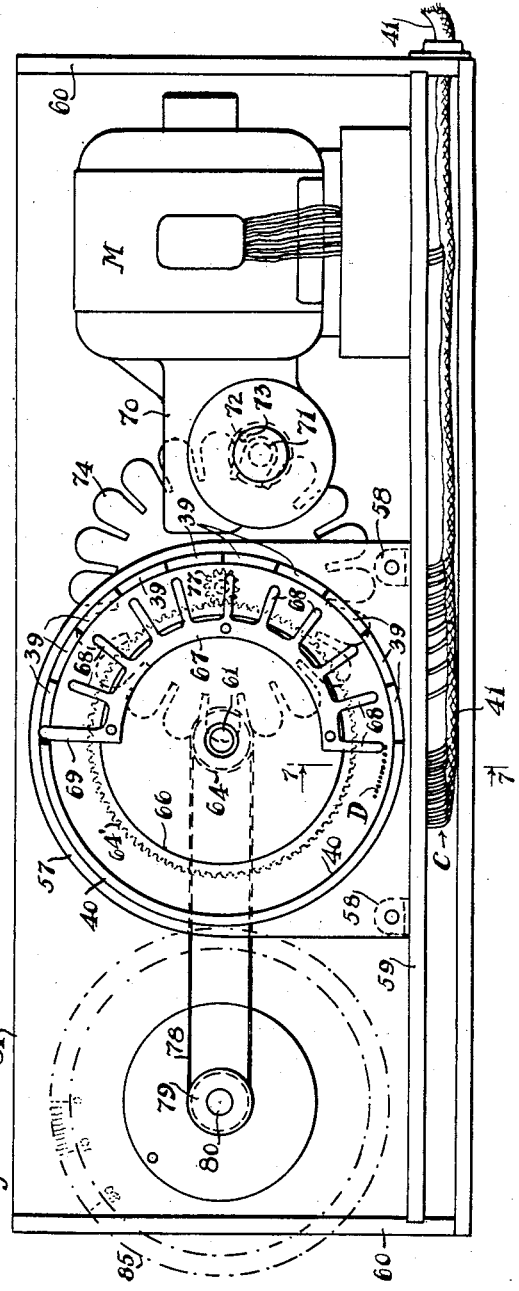
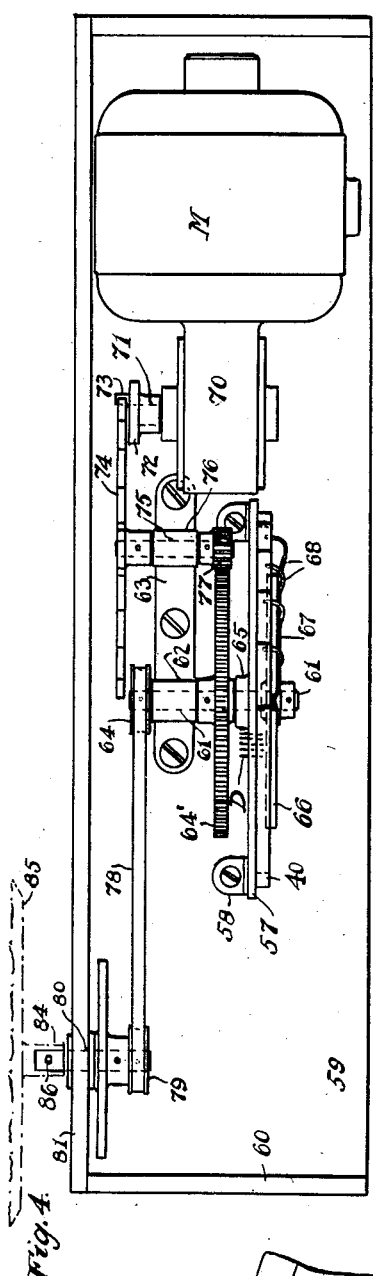
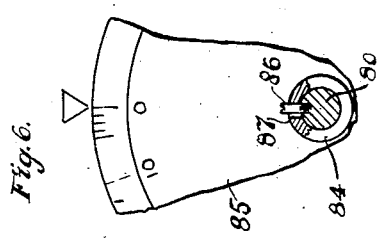
INVENTOR
William A. Mullio
BY
Harold D. Penney ATTORNEY Aug. 25, 1936.                    W. A. MULLIO                    2,052,147
                         REMOTE RADIO SET CONTROL MEANS
                    Filed Aug. 12, 1930            3 Sheets-Sheet 3

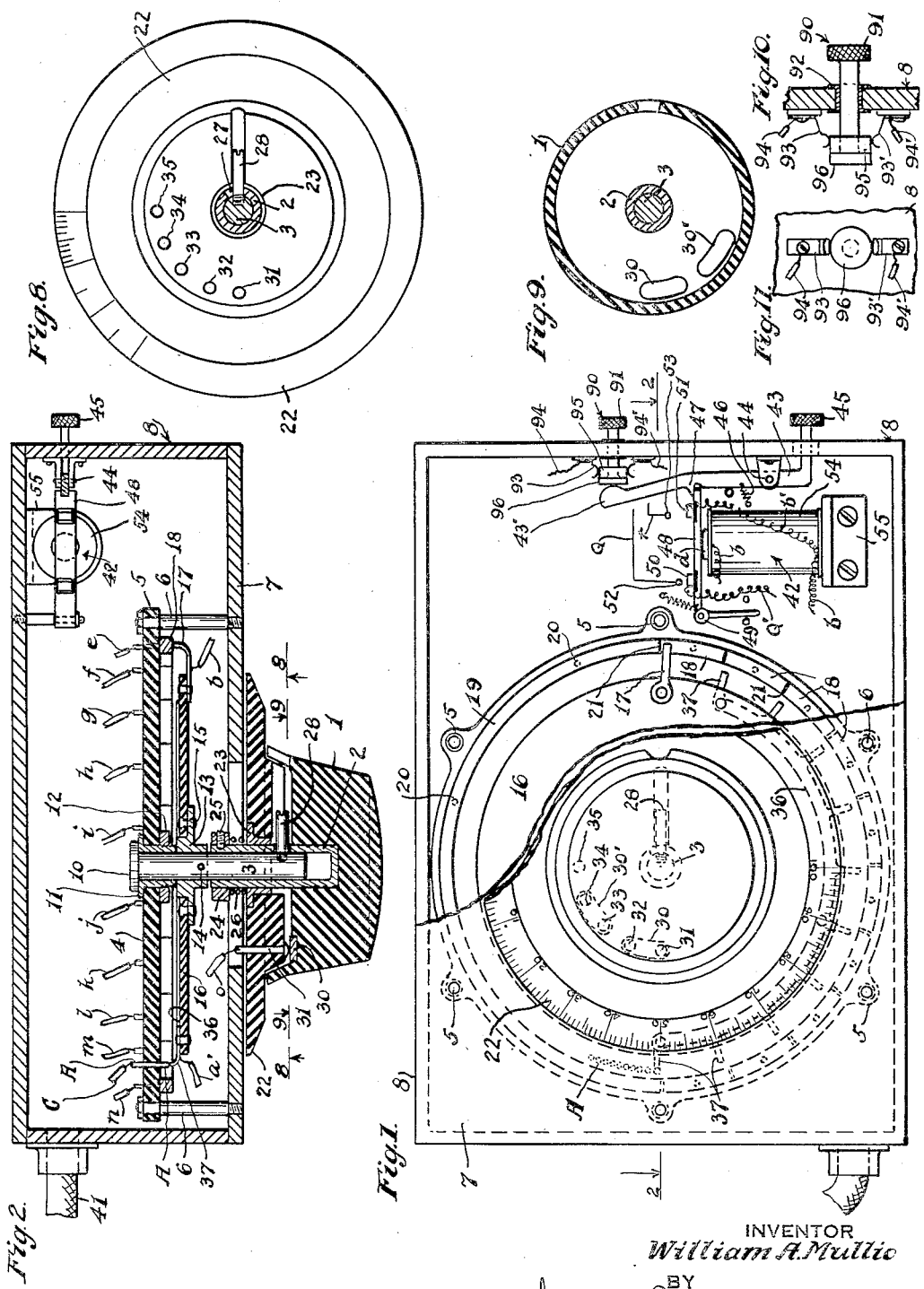

INVENTOR
*William A. Mullio.*
BY
*Harold D. Penney*
ATTORNEY

Patented Aug. 25, 1936

2,052,147

UNITED STATES PATENT OFFICE 2,052,147

REMOTE RADIO SET CONTROL MEANS

William A. Mullio, New York, N. Y.

Application August 12, 1930, Serial No. 474,762

5 Claims. (Cl. 250—40)

My present invention relates to an improvement in remote control devices for effectively controlling, at one station, the operative action of a controlled device which is remote therefrom, whereby the controlled device may be caused to operate to move to any desired related position as predetermined by the setting of the control device.

Another object is the provision of means for electrically accomplishing the above noted result.

Another object is to provide a settable control and a follower controlled means whereby the control means may be set for controlling the controlled means to operate in one, or an opposite direction, and a means for causing the controlled means to follow in rapid step by step response.

Another object is to provide a primary actuating means, shown in the present construction in the form of a reversible electric motor, the control of which motor is also under the starting and control means of the controlling device.

Another object is the provision of a control system whereby, if desired, a plurality of such control devices may be coupled to the controlled means so that such control of the mechanism herein outlined may be initiated from a plurality of unrelated, individual stations remote from the controlled means and each other.

Another object of the invention is to provide means for starting the motor to actuate the remotely controlled device and for automatically cutting out and stopping the motor after the controlled device has reached the predetermined position.

A further object of the invention contemplates the provision of a circuit closing means for energizing the control device circuits herein outlined and means, also, for simultaneously energizing the apparatus to be controlled thereby, in the present instance a radio set, whereby said latter apparatus may be energized at the instant of energizing the remote control means, and may thereafter be left energized without regard to the further energizing or de-energizing of the remote control means, during its various sequences of automatic and manual settings.

Another object is to provide a construction whereby numerous intermediate positions, located between the main positions of the controlled device may be set. To this end I provide a single set of vernier positions between the main setting positions of the controlled means, and a single set of vernier positions between the main positions of the controlling means whereby said vernier positions may be used to stop the controlled device in any intermediate position between any of the main positions. Thereby, said single vernier sections of the controlling and controlled mechanisms permit them to be used between all main stops, thus eliminating a large amount of complex wiring as will be described later in detail.

Another object is to provide a remote controlled device which is separately housed, and which contains therein all of the electric circuit control devices, including means for starting and stopping the motor, means for introducing a time lag between successive positions sufficient to overcome the tendency of the inertia of the motor for carrying the device past the position selected, means for reversing the current thereto, and electric circuit closing means for causing the controlled device and apparatus controlled thereby to be energized, and a separate housing for the controlled means.

Thus, by the construction hereinafter outlined, due to the reduction of the amount of wiring, a comparatively small cable may be run from any controlling device to the controlled device which renders said cable flexible, economical and readily installed.

The device is shown as applied, preferably, to the tuning control of a radio set, whereby from a distance any desired wave length or arbitrary divisions upon the dial scales may be positioned from the remote control means. However, this control device is not limited to the tuning control of radio sets, as its structure comprehends utility in other fields of endeavor besides remote control of radio receiver tuning.

In the accompanying drawings:

Fig. 1 is a plan view of the control member having portions of its housing and structure broken away to show the interior thereof.

Fig. 2 is a sectional view taken on the line 2—2, Fig. 1, looking in the direction of the arrows.

Fig. 3 is an elevational view of the controlled mechanism and its housing, having one side and the cover removed therefrom to better show the mechanism.

Fig. 4 is a plan view of Fig. 3 with the cover removed to show the appurtenant mechanism.

Fig. 6 is a fragmentary view showing one of the rotatable tuning dials of a radio receiving set, and a time lag construction in the connecting of said dial to the tuning shaft of the controlled device.

Fig. 7 is a fragmentary section taken about the point 7—7, Fig. 3, looking in the direction of the arrows.

Fig. 8 is a plan view of the controller dial with the motor current reversing knob removed, which view is indicated by the arrows 8—8, Fig. 2.

Fig. 9 is a sectional view of the motor current reversing knob, looking in the direction of the arrows 9—9, Fig. 2.

Fig. 10 is a fragmentary enlarged view of the apparatus or radio set switch, shown partly sectioned for clearness.

Fig. 11 is a front view thereof enlarged.

Figure 5:
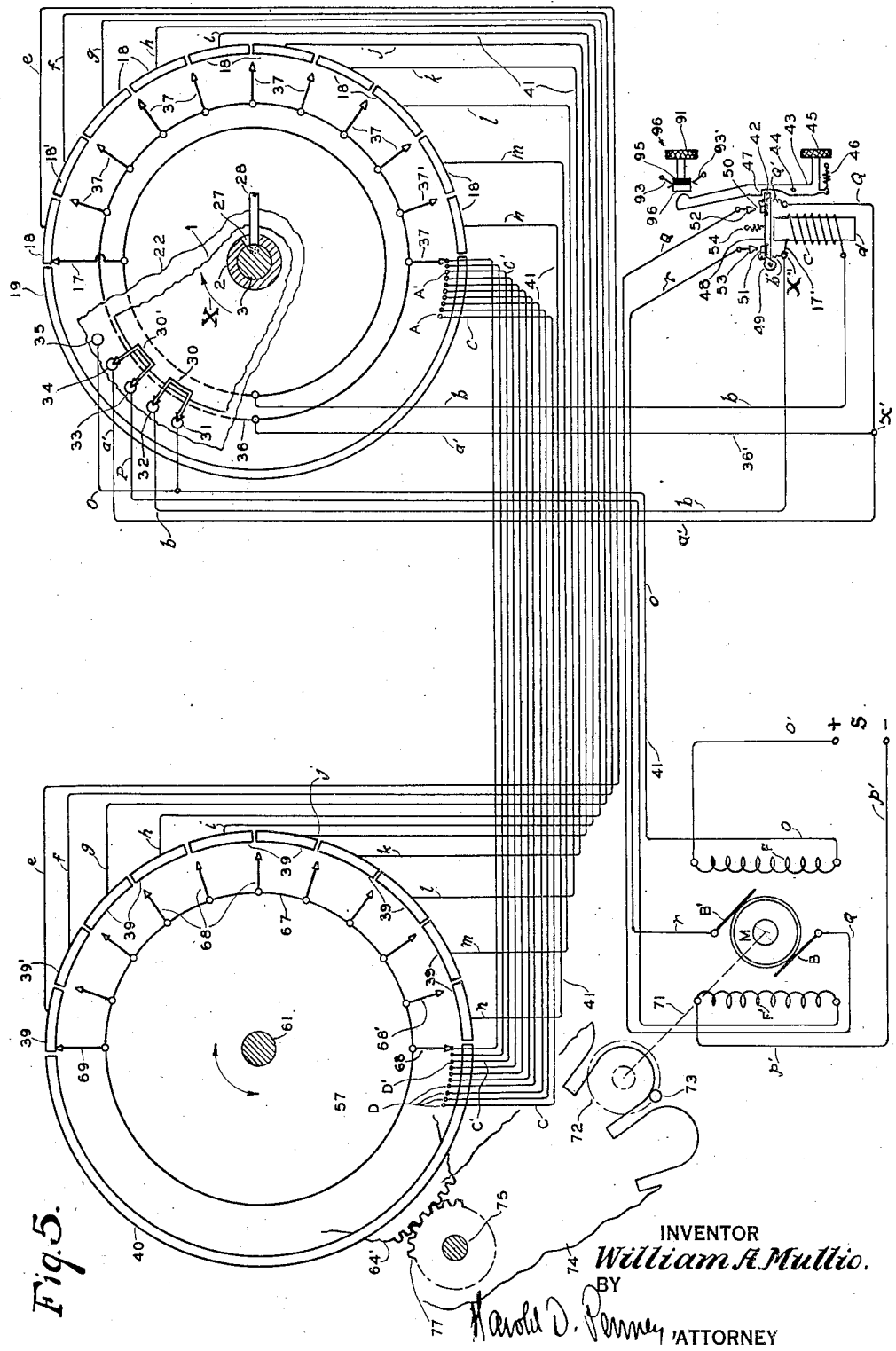
Fig. 5 is a diagrammatic illustration of the electrical control and controlled circuits used herein.

In Figs. 1 and 2 the manually controlled means for setting the present control system are shown as comprising a dielectric control knob 1 which is molded about a metal thimble or sleeve 2 which is bored to receive therein a headed stud shaft 3, which shaft is supported upon a fixed dielectric support or frame plate 4, this being provided with a plurality of ears 5, Fig. 1, through which are passed shouldered supporting studs 6 one end of which is threadedly mounted upon the front wall 7 of the housing 8, the front wall being partially broken away in Fig. 1 to better disclose the other mechanism mounted therein.

The shaft 3 is headed at its inner end as at 10 and is rotatably supported to the back plate 4 by an inserted threaded thimble 11, on the front end of which is located a locking nut 12 so that when supported by the thimble 11, 12 the shaft 3 is firmly and rotatably supported in the back plate 4.

Upon the shaft 3, Fig. 2 is mounted a flanged metal bushing 13 which is bored to snugly fit the shaft 3 and is pinned or keyed thereto by a pin 14. To this supporting flange 13 is suitably affixed, by rivets 15 a circular dielectric disk 16 which radially carries near its outer periphery a plurality of spaced outstanding metal contact members, and a master contact 17, which is of sufficient length to contact with a plurality of adjacent dielectrically separated metallic sectors 18 which are circularly disposed and are fixedly arranged to the front of the insulating supporting plate 4.

The sectors 18, in combination with a major non-circuit portion 19 thereof, constitute a metallic ring seat to afford a circular path with which the radial master contact member 17 is always in sliding contact so that upon rotation of the shaft 3 by means later to be described, the disk 16 is rotated to cause 17 to move from one sector 18 to another in either direction, it being understood that the sectors 18 are substantially each in an individual electric circuit connection, while the larger section 19 thereof is out of electrical connection and performs no other function than continuing the annular seat for the switch member 17, for permitting said member 17 to rotate in either direction, freely.

The sectors 18 are individually separated, electrically, by spaces therebetween and it will be understood that said spaces may be filled with a dielectric material as 21, or an air gap may be left therebetween, so that the sectors are electrically separated one from the other.

The master contact member 17, as is indicated in Fig. 2, is bent at its outer end toward and bears upon the outer plane face of the metallic sector ring 18—19.

The disk 16 has, further, rigidly affixed, on the face opposite to that on which the master contact 17 is mounted, a single metallic contact sector 36, which is provided with a plurality of radially extending station brush or contact fingers 37, in the present instance ten in number, though more or less may be used. These fingers are a part of the sector 36 and are of such length that they do not extend far enough out to touch the sector contacts 18, but are electrically spaced therefrom. The radial spacing of the fingers from each other and from the master contact 17 are equal. The fingers 37 are preferably as shown in Fig. 2, bent backwardly toward the support plate 4, and are of such length as to make sequential contact with a plurality of grouped vernier contacts, ten in number, and generally denoted by A, Figs. 1 and 2. The group of vernier contacts A are located so that the first one thereof is in contact with the last brush member 37 while the contact 17 is in contact with the first sector 18.

The group of brush members 37 are connected by a lead wire $a'$ to a fixed terminal member 34, Figs. 5 and 8. The master contact 17 is connected by wire $b$ through a motor starting relay switch coil $c$ and core $d$ to terminal member 32, Figs. 5 and 8.

Each of the control sector contacts 18 are connected by wires $e$, $f$, $g$, $h$, $i$, $j$, $k$, $l$, $m$ and $n$ to a series of ten fixed sector rings 39 mounted upon the dielectric support plate 57 on the controlled mechanism shown in Figs. 3 and 5, this latter ring also having a dead major sector 40 similar to sector 19 of the control ring in Fig. 1, and for the same purpose. As thus described, sectors 18 are in electrical connection with the sectors 39, the wiring thus described being in the form of a cable 41, Fig. 3, of any desired length.

As a means for operating the control disk 16 there is provided an indexed control dial 22, a front view of which is shown in Figs. 1 and 8, in which the dial is separated from the remainder of the mechanism, and it is provided with an integral metal flange 23 which may be molded therein and which in turn is rotatably mounted upon the sleeve 2 of the motor reversing control knob 1. In order that the motor control knob and the control dial 22 may be held in operative position upon the front of panel 7, the sleeve 2 has a collar 24 secured thereon by a set screw 25 and between the sleeve and the inside face of the control dial 22 is located a friction creating take-up spring 26, and this construction thereby holds the control dial and the knob in operative rotative relation, one with the other, and keeps the contacts 31 to 35 in contact relation to the contact plates 30 and 30'.

In order to mount both the dial 22 and the knob 1 in fixed rotative relation to the front panel 7 there is provided an elongated lag slot 27 in the sleeve 2 into which there is introduced a threaded pin 28 which is screwed into a threaded hole in the shaft 3, and thus the dial 22 and knob 1 are tied to the rotatably mounted shaft 3. It will be noted that the knob 1 may be rotated a slight amount in either direction, relative to its position on the shaft 3 by reason of the elongated lag slot 27, and this permits the knob 1 to be rotated a short distance clockwise or anticlockwise for initially controlling the flow of current to the fields of the motor in either direction to cause the motor to reverse in rotation, as desired, without causing a setting movement of the dial 22 to this limited extent.

The motor reversing knob 1, Figs. 2 and 9, is a switch and is provided with two spaced metal contact plates 30 and 30', spaced apart a sufficient distance to contact upon the fixed terminal members 31, 32, 33, 34 and 35 which are integrally mounted on the inner portion of the dial 22, Fig. 2. To these various terminal members 31, 32, 33, 34 and 35 are attached wires which lead to the motor, and these will later be described in detail.

When the dial 22 is rotated in either direction it carries with it the motor control switch knob 1, but the motor control knob, to the limited extent above noted, may be moved slightly independent of the dial 22, to cause the motor to run in desired direction.

The terminals 31 to 35 are connected by wires as follows: 31 is connected by wire $o$ to field $F$ of the motor M, 32 as previously described, 33 by wire $p$ to field $F'$ of the motor M, 34 previously described, and 35 is connected in common with terminal 31.

Thus when the motor starting switch 42, Figs. 1 and 5, to be later described in detail is closed, current from a source S, Fig. 5, causes the motor to revolve. The direction of rotation is controlled by the initially rotated position of the knob switch 1 and its contact plates 30—30'.

Thus, if the knob switch 1 is set as indicated in Fig. 1 and the switch button 45 is pressed, closing the switch member 42, the circuits are closed as indicated in Fig. 5, thereby causing the current to pass as follows: from plus side of current source S to field F of motor M, through plate 30 to contact 32 through $b$ to $b'$ to $r$ to motor brush $B'$ through to motor brush B, to $q$ to $q'$, to $a'$ to contact 34, through plate 30' to terminal 33, to P, to field $F'$ of the motor and thence to $p'$, to minus source S thus completing the circuit and causing the motor to rotate in one direction. It is understood that the switch 42 is closed and not open as shown in Figs. 1 and 5.

When it is desired to cause the motor M to operate in the opposite direction, the knob switch 1 is rotated forwardly in the direction of the arrow X, Fig. 5, and the plates 30—30' are then moved to cover the contacts 32—33 and 34—35. This operation causes current to flow through said plus side of current source S to field F, thence through $o$ to 35, through plate 30' to 34, to $a'$, $q$, $q'$ to $q$ to motor brush B, through motor M, to brush $B'$ to $r$ to $b'$ to $b$ to 32, through 30 to 33, to P, to field $F'$ to $p'$ to current source S, thus completing a current flow through motor M in the reverse to that previously described.

The switch 42 is a hand or clock operated relay switch and is so constructed as to permit hand operation to connect the motor to current source S, Fig. 5. To this end it comprises a pivoted hand release button lever 43, pivoted at 44, the button 45 being exposed exteriorly of the housing, and normally held with its latch end 47 under restraint of the pivoted spring actuated contact carrier bar 48, by a spring 46. The carrier bar 48 is pivoted at 49 to a suitable support and carries two spaced insulated metallic contacts 50, 51 which, when the lever 48 is released close the contacts 52—53 of the wires $q$ and $r$, respectively. The insulated contacts 50, 51 are, Fig. 1, connected to wires $q$ and $b$, by connections $q'$ and $b'$. The carrier bar 48 is connected by a spring 54, suitably held, to close the bar when the manual latch 47 is released.

The switch 42 is so constructed that when the controlled mechanism Figs. 3 and 4, later to be described, has been started by this switch, the motor then operating in the direction desired for selecting the desired setting of the controlled mechanism, upon this latter device reaching its indicated position, the switch 42 is automatically opened to stop the motor, and thus discontinue further movement of the controlled mechanism until the control means are again set.

To this end the switch 42 is provided with a solenoid magnet 54 mounted on a bracket 55, Fig. 1, and comprising a core $d$ and a coil $c$, thereabout, which coil is in shunt circuit with lines $b$—$b'$. Thus, as the motor M reaches a predetermined point of setting, current flow through $b$—$b'$ will excite the solenoid and draw lever 42 from contacts 50—51 and stop the motor.

The switch 42 is further so constructed that when manually or otherwise operated to start the remote control means into operation, as described, that it also closes a circuit leading to the apparatus or radio set, not shown, thus to put such apparatus into electrical circuit for actuation. To this end the switch lever 43 has an extension, shown in Fig. 1 and Fig. 5, having an angularly disposed cam end 43' which bears against the lower end of push plug switch, the metallic conductive end 96 which is in contact with said cam end 43', Fig. 1 and Fig. 5.

The plug switch generally denoted by 90, Figs. 1 and 5, is mounted for reciprocation in a bushing 92 located in the side wall 8 of the housing, Fig. 10, and is provided with a dielectric non-conducting head 95 and has on its opposite exteriorly located end a push button 91.

Located on opposite sides of the heads 95—96 are a pair of metallic conducting spring switch fingers 93—93', these in turn being connected to conducting wires 94 and 94'. These wires are led to the apparatus or radio set, not shown, and are connected thereto so that when switch 43 is operated to start the remote control devices, the radio set is also put into circuit.

As shown in Figs. 1 and 5, the switch 90 is positioned so that the non-conductive head 95 is located between the spring contact fingers 93 and 93'. When the switch lever 43 is operated to release carrier bar 48, to close the contacts 52—53, Fig. 1, the cam end 43' of lever 43 pushes the plug switch outwardly and causes the conductive head 96 to contact with fingers 93 and 93', and thereby closes the contacts to actuate the radio set.

Any further action of lever 43 during operation of the control means leaves head 96 in contact with fingers 93 and 93', and does not disturb the closed setting thereof.

Thereafter when it is desired to cut out the radio set, the button 91 is pushed in and the radio set is cut out of circuit.

The vernier group A comprises a plurality of metallic connectors, preferably in the form of pins which extend through supporting back wall 4 and are exposed on both faces thereof. On the front face the ends are all exposed to contact with the fingers 37 as they are moved thereover, Fig. 2. The rear ends of the connectors A are connected to a series of wires C, and these are directly and sequentially connected to a similar series of vernier contacts D, Figs. 3, 4, 5 and 7 which are carried by a fixed dielectric support plate 57 which is held in the present instance by screw held angle brackets 58 to the false floor 59 of the controlled mechanism housing 60.

To this support wall or plate 57 is mounted a rotary follower switching mechanism quite similar to that described for the controller switch means. This consists in a central driven shaft 61 which is rotatably mounted in a bearing 62 which is located upon a bearing bracket 63, Fig. 4, said shaft having keyed thereon on its outer end a belt driven pulley 64, and on the opposite side of the bearing 62 has pinned or keyed thereto a gear wheel 64'. The shaft 61 extends forwardly of the gear 64' and passes through a bearing sleeve 65 mounted in the dielectric support 57 and has on its outer end a hubbed dielectric disk 66 which is pinned or keyed to said shaft end.

The disk 66 has affixed to its front face a metallic conductive sector 67 having a plurality of extending contact fingers 68, ten in number to correspond to the ten contact fingers 37 on disk 16, Fig. 1, one of the extending contact fingers 69 being longer than the fingers 68, so as to extend over and contact with the insulated sector ring 39, Fig. 3.

A motor M, preferably electric, is mounted to the false floor 59 and it has attached thereto a worm gear speed reducing means, not shown, but of well known kind which is housed in the worm gear housing 70. A shaft 71 from the driven worm gear carries an intermittent keyed drive means thereon comprising a hubbed disk 72 having an eccentrically located driving pin 73 thereon, Figs. 3, 4 and 5. When the motor operates the pin describes a circular path about shaft 71 and in turn intermittently drives, step by step, a cam toothed wheel 74 which is mounted to engage with said pin 73 in driving relation.

The wheel 74 is fixedly mounted to a shaft 75 rotatably mounted in bearing 76 which in turn is supported on bearing bracket 63, this latter being affixed to the false bottom 59 by screws as shown in Fig. 4.

The opposite end of shaft 75 has affixed a pinion gear 77 which is in mesh with the gear 64' and adapted to slowly operate the controlled unit.

Belt 78 which drives a pulley 79, serves to connect the controlled means with the tuning control of a radio set. The pulley 79 is securely fastened to a shaft 80 which is supported in a bearing in the wall 81 of the controlled unit. The said shaft 80 is provided with a drive pin 86 which engages the side of a slot 87 in the hub portion of a radio dial 85. The slot 87 is formed slightly wider than the drive pin 86 which enables the operator to select a half degree movement if necessary.

Thus motor M, Fig. 4, in operation drives pulley 64 with a step by step rotation in either direction, as predetermined. In turn, pulley 64 by means of a belt 78 drives pulley 79 which is fixed to shaft 80, this turn being rotatably mounted in the rear wall 81 of the housing 60. At the outer end of the shaft 80 is affixed a coupling 84 which in turn couples the shaft 80 to the tuning dial 85 of a radio set, not shown. Obviously, the coupling 84 may be attached directly to the tuning means of a radio set, if so desired.

As described, the motor M operated to rotatably control the tuning means of a radio set, or other type of mechanism desired to be controlled from a distance, in one or an opposite direction of rotation according to the setting of knob switch 1 of the distant control means.

After the rotation direction control knob switch 1 has been set, and the switch 42 has been closed and the motor M started, the station or position dial 22 having been set to desired station position, the motor M must be stopped when the controlled mechanism has reached the corresponding position. Means are provided for this purpose and this will now be described, in conjunction with a description of the operation of the complete device.

This apparatus consists of two electric circuits one of which controls the motor drive and the other controls the switch solenoid, and both of which are automatically broken by the lever 42, of the said solenoid switch. The motor circuit starts at the source as S, Fig. 5, through wire O', to the field F to the wire O and to the contact points 31 and 35 of the motor reversing switch. In Fig. 5, the apparatus is shown as set for zero, and assuming it was desired to turn the tuning dial 85 of the radio set to index position 12, the knob 1 of the control unit, Fig. 2, would be turned in the proper direction until the dial 22 indicates the desired position or station wanted, and in so doing the contact plates 30 and 30' contact the terminals 32 and 33, 34 and 35 respectively, of the motor circuit causing the motor M to revolve in the proper direction.

By pressing the lever 43 of the solenoid switch, current from the source, as S, would be carried by the wire O' to the field of the motor through wire O to the reversing motor switch terminals 31 and 35, through plate 30' to terminal 34, through wire $a'$, contact points 50 and 52, through Q to the brush B of the motor M, and returning through brush B, to wire $r$, to contacts 53 and 51 to $b'$ and $b$, to terminal 32, through plate 30 to contact 33, to wire P to field F' to the wire $p'$ and to the source S.

From the above, it will now be understood, how a circuit is set up or closed, which causes the motor M to revolve the shaft 61 of the controlled unit. The wires $q$ and $a'$ are tapped by a wire 36' at X' and conducts the current to contact member 36. The wires $b'$ and $b$ are tapped at X" by a wire 17' which conducts the current through to switch coil $c$ and to the contact member 17 of the controller unit, and as aforementioned, if the controller dial 22 is set for twelve, current will pass through the member 17 through the contact 18' and the wire $f$ to the contact 39' of the controlled member, and when the motor M revolves the shaft 61 and the contact member 67 to a position where the contact 69 of the member 67 touches 39', the said member 67 then conducts the current until the contact 68' has reached the contact D' when an unbroken circuit is made through the wire C' and contacts A' and 37' to the contact member 36.

It can now be clearly understood that as the said circuit is made, current will pass through the coil wire $c$ which will energize the core $d$ and cause the switch lever 42 to be operated and thereby cutting off all electric current and stopping the motor M.

What I claim is:

1. In combination with a radio-receiver, a housing, a fixed dielectric support therein, a series of circularly arranged contact sectors thereon, a rotatable dielectric disk, a master switch carried thereon and arranged to sweep the said contact sectors, a series of vernier contacts, a series of vernier switches cooperable with said contacts, a motor, a remote housing, a fixed dielectric support therein, a dielectric disk rotatable on said support, a series of circularly arranged contact sectors and a series of circularly arranged vernier contacts also on said fixed support, a switch plate on said rotatable disk and having a switch tongue engaging said sectors and a series of vernier switches for engaging said vernier contacts, said switch tongue and said vernier switches being unitary, means for operating the said motor to operate the controlled device and connections with said controlled device for tuning the dial of said radio receiver.

2. In a remote control for a radio receiver, the combination of a tuning device for the receiver; a remote control device; each device comprising a pair of relatively movable members, one of which carries a series of master contacts and a series of closely grouped vernier contacts, corresponding contacts of the respective devices being electrically connected, the other member carrying a master contact arm and a plurality of vernier contact arms adapted to sweep the master and vernier contacts respectively; corresponding members of said devices being fixed, the movable member of the tuning device being a tuning member connected to the tuning means of the radio receiver, the movable member of the remote device being a control member; a source of current; a motor for the tuning member; conductors connecting the motor to said source; a relay comprising yieldably closed switches interposed in said conductors respectively, and a solenoid adapted when energized to open said switches; means electrically connecting all of the contact arms of the tuning device; a pair of conductors connecting the terminals of said source respectively to the master and vernier contacts of the control device; the solenoid of said relay being interposed in one of said last named conductors whereby when said contact arms engage corresponding fixed contacts, said solenoid is energized and said switches are opened to cut off the current from the motor.

3. In a remote control for a radio receiver, the combination of a tuning device for the receiver; a remote control device; each device comprising a pair of relatively movable members, one of which carries a series of master contacts and a series of closely grouped vernier contacts, corresponding contacts of the respective devices being electrically connected; the other member carrying a master contact arm and a plurality of vernier contact arms adapted to sweep the master and vernier contacts respectively; corresponding members of said devices being fixed, the movable member of the tuning device being a tuning member connected to the tuning means of the radio receiver, the movable member of the remote device being a control member; a source of current; a motor for the tuning member; conductors connecting the motor to said source; means electrically connecting all of the contact arms of one of the devices; a pair of conductors connecting the terminals of said source respectively to the master and vernier contacts of the other device; and current-operated motor-arresting means connected in circuit between said last named conductors for completing a circuit and bringing the motor to rest when said movable contacts engage corresponding fixed contacts.

4. In a remote control for a radio receiver, the combination of a tuning device; a remote control device; each device comprising a pair of relatively movable members, one of which carries a series of master contacts and a series of closely grouped vernier contacts, corresponding contacts of the respective devices being electrically connected, the other member carrying a master contact arm and a plurality of vernier contact arms adapted to sweep the master and vernier contacts respectively, all of the contact arms of the tuning device being electrically connected; corresponding members of said devices being fixed, the movable member of the tuning device being connected to the tuning means of the radio receiver, the movable member of the remote device being a control member; an actuating member on said control member for moving the latter and having limited movement relative to the control member when the direction of movement of the actuating member is reversed; a source of current; a reversing motor for the tuning member; conductors connecting the motor to said source; a reversing switch actuated by said actuating member on such limited movement and interposed in said conductors; a relay comprising yieldably closed switches interposed in said conductors respectively, and a solenoid adapted when energized to open said switches; a manual latch for holding said switches open; a pair of conductors connecting the terminals of said source respectively to the master and vernier contacts of the control device; the solenoid of said relay being interposed in one of said last named conductors.

5. In a remote control for a radio receiver, the combination of a tuning device for the receiver; a remote control device; each device comprising a pair of relatively movable members, one of which carries a series of contacts, corresponding contacts of the respective devices being electrically connected; the other member carrying a contact arm adapted to sweep said contacts one at a time; corresponding members of said devices being fixed, the movable member of the tuning device being connected to the tuning means of the radio receiver, the movable member of the remote device being a control member; a source of current; a motor for the tuning member; conductors connecting the motor to said source; a relay comprising yieldably closed switches interposed in said conductors respectively, and a solenoid adapted when energized to open said switches; manual means for holding said switches open and for closing them after the control device has been adjusted; conductors respectively connecting the terminals of said source to said contact arms respectively; the solenoid of said relay being interposed in one of said last named conductors whereby when said contact arms engage corresponding fixed contacts, said solenoid is energized and said switches are opened to cut off the current from the motor.

WILLIAM A. MULLIO.